US012619119B2

(12) United States Patent
Chung et al.

(10) Patent No.: US 12,619,119 B2
(45) Date of Patent: May 5, 2026

(54) COLOR ELECTROPHORETIC DISPLAY

(71) Applicant: E Ink Holdings Inc., Hsinchu (TW)

(72) Inventors: Xian-Teng Chung, Hsinchu (TW); Liang-Yu Lin, Hsinchu (TW); Jau-Min Ding, Hsinchu (TW); Po-Yuan Lo, Hsinchu (TW); Ian French, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 478 days.

(21) Appl. No.: 18/170,546

(22) Filed: Feb. 17, 2023

(65) Prior Publication Data

US 2023/0333438 A1      Oct. 19, 2023

(30) Foreign Application Priority Data

Apr. 15, 2022    (TW) .................................. 111114361

(51) Int. Cl.
| | |
|---|---|
| *G02F 1/167* | (2019.01) |
| *G02B 5/20* | (2006.01) |
| *G02F 1/16757* | (2019.01) |
| *G02F 1/1677* | (2019.01) |

(52) U.S. Cl.
CPC ............. *G02F 1/167* (2013.01); *G02B 5/201* (2013.01); *G02F 1/16757* (2019.01); *G02F 1/1677* (2019.01)

(58) Field of Classification Search
CPC .... G02F 1/167; G02F 1/16757; G02F 1/1677; G02B 5/201
See application file for complete search history.

(56) References Cited

U.S. PATENT DOCUMENTS

| | | |
|---|---|---|
| 5,734,457 A | 3/1998 | Mitsui et al. |
| 6,731,366 B1 | 5/2004 | Goang et al. |
| 6,842,209 B2 | 1/2005 | Sumiyoshi et al. |
| 9,316,779 B1 | 4/2016 | Hou et al. |
| 9,690,036 B1 | 6/2017 | Hou et al. |
| 10,120,184 B1 | 11/2018 | Langendijk et al. |
| 10,254,581 B2 | 4/2019 | Qi et al. |
| 10,761,362 B2 | 9/2020 | Liu et al. |

(Continued)

FOREIGN PATENT DOCUMENTS

| | | |
|---|---|---|
| CN | 102375281 A | 3/2012 |
| CN | 106773258 A | 5/2017 |

(Continued)

OTHER PUBLICATIONS

The office action of corresponding TW application issued on Jan. 17, 2023.

(Continued)

*Primary Examiner* — Charles S Chang
(74) *Attorney, Agent, or Firm* — CKC & Partners Co., LLC

(57) ABSTRACT

A color electrophoretic display includes a display region, a pixel array, a display medium layer, an optical layer, a first color filter array, and a second color filter array. The display region includes multiple sub-pixel regions. The pixel array corresponds to the display region in position. The display medium layer is located on the pixel array. The optical layer is located on the display medium layer. The first color filter array is located on the optical layer. The second color filter array is located between the display medium layer and the optical layer.

16 Claims, 8 Drawing Sheets

(56) References Cited

U.S. PATENT DOCUMENTS

| | | | |
|---|---|---|---|
| 2003/0063369 A1* | 4/2003 | Kawai | G02F 1/1677 |
| | | | 359/296 |
| 2003/0156236 A1 | 8/2003 | Yamada | |
| 2009/0109172 A1* | 4/2009 | Lee | G09G 3/344 |
| | | | 345/107 |
| 2012/0013983 A1* | 1/2012 | Chang | G02F 1/1675 |
| | | | 359/491.01 |
| 2013/0083390 A1* | 4/2013 | Hwang | G02F 1/1362 |
| | | | 359/290 |
| 2015/0153614 A1 | 6/2015 | Qi et al. | |
| 2016/0161819 A1 | 6/2016 | Fichet et al. | |
| 2021/0255520 A1* | 8/2021 | Tomizawa | G09F 9/302 |
| 2022/0037628 A1* | 2/2022 | Joo | H10K 59/8792 |
| 2022/0223653 A1* | 7/2022 | Kim | H10K 59/38 |

FOREIGN PATENT DOCUMENTS

| | | |
|---|---|---|
| CN | 107003584 A | 8/2017 |
| EP | 1070276 B1 | 6/2005 |
| WO | 2014146937 A2 | 9/2014 |

OTHER PUBLICATIONS

The office action of corresponding CN application No. 202210398217.7 issued on Mar. 14, 2026.

* cited by examiner

COLOR ELECTROPHORETIC DISPLAY

CROSS-REFERENCE TO RELATED APPLICATION

This application claims priority to Taiwan Application Serial Number 111114361, filed Apr. 15, 2022, which is herein incorporated by reference in its entirety.

BACKGROUND

Field of Invention

The present invention relates to a color electrophoretic display.

Description of Related Art

A printed color filter layer is use to filter the light reflected by the display medium layer so as to form the color image in a color electrophoretic display nowadays. However, when the pixel fill factor of the color resists is too high, color mixing problem caused by adjacent two of the color resists may occur easily. When the pixel fill factor of the color resists is too low, the color performance of the color electrophoretic display may be affected.

Accordingly, it is still a development direction for the industry to provide a color filter array which can solve the problems mentioned above.

SUMMARY

The invention provides a color electrophoretic display.

In some embodiments, the color electrophoretic display includes a display region, a pixel array, a display medium layer, an optical layer, a first color filter array, and a second color filter array. The display region includes multiple sub-pixel regions. The pixel array corresponds to the display region in position. The display medium layer is located on the pixel array. The optical layer is located on the display medium layer. The first color filter array is located on the optical layer. The second color filter array is located between the display medium layer and the optical layer.

In some embodiments, the first color filter array and the second first color filter array have different pixel fill factors.

In some embodiments, a pixel fill factor of the first color filter array is smaller than a pixel fill factor of the second color filter array.

In some embodiments, the pixel fill factor of the first color filter array is in a range from 25% to 35%.

In some embodiments, the pixel fill factor of the second color filter array is in a range from 70% to 90%.

In some embodiments, the first color filter array includes a plurality of first color resists, and each one of the first color resists includes a plurality sections separated from each other.

In some embodiments, the first color filter array includes a first color resist, the second color filter array includes a second color resist, the first color resist corresponds to the second color resists in position, and the first color resist and the second color resist have the same color.

In some embodiments, the first color filter array includes a first color resist, the second color filter array includes a second color resist, the first color resist corresponds to the second color resists in position, and the first color resist and the second color resist have different colors.

In some embodiments, the first color resist has a first color, the second color resist has a mixed color, and the mixed color comprises the first color and a second color different from the first color.

Another aspect of the present disclosure is a color electrophoretic display.

In some embodiments, the color electrophoretic display includes a display region, a pixel array, a display medium layer, an optical layer, a first color filter array, and a second color filter array. The display region includes multiple sub-pixel regions. The pixel array corresponds to the display region in position. The display medium layer includes multiple microcapsules and is located on the pixel array. The optical layer is located on the display medium layer. The first color filter array is located on the optical layer. The second color filter array is formed on the microcapsules.

In some embodiments, the second color filter array is configured to be printed or ink-jetted on the microcapsules.

In some embodiments, a pixel fill factor of the first color filter array is smaller than a pixel fill factor of the second color filter array.

In some embodiments, the pixel fill factor of the first color filter array is in a range from 25% to 35%.

In some embodiments, the pixel fill factor of the second color filter array is in a range from 70% to 90%.

In some embodiments, the first color filter array includes a plurality of first color resists, and each one of the first color resists includes a plurality sections separated from each other.

In some embodiments, the first color filter array includes a first color resist, the second color filter array includes a second color resist, the first color resist corresponds to the second color resists in position, and the first color resist and the second color resist have the same color.

In some embodiments, the first color filter array includes a first color resist, the second color filter array includes a second color resist, the first color resist corresponds to the second color resists in position, and the first color resist and the second color resist have different colors.

In some embodiments, the first color resist has a first color, the second color resist has a mixed color, and the mixed color comprises the first color and a second color different from the first color.

In the aforementioned embodiments, by disposing the first color filter array and the second color filter array at the same time, the color mixing problem can be prevented without affecting the color performance or the performance of the color electrophoretic display will not be affected by preventing the texture from appearing on the display.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
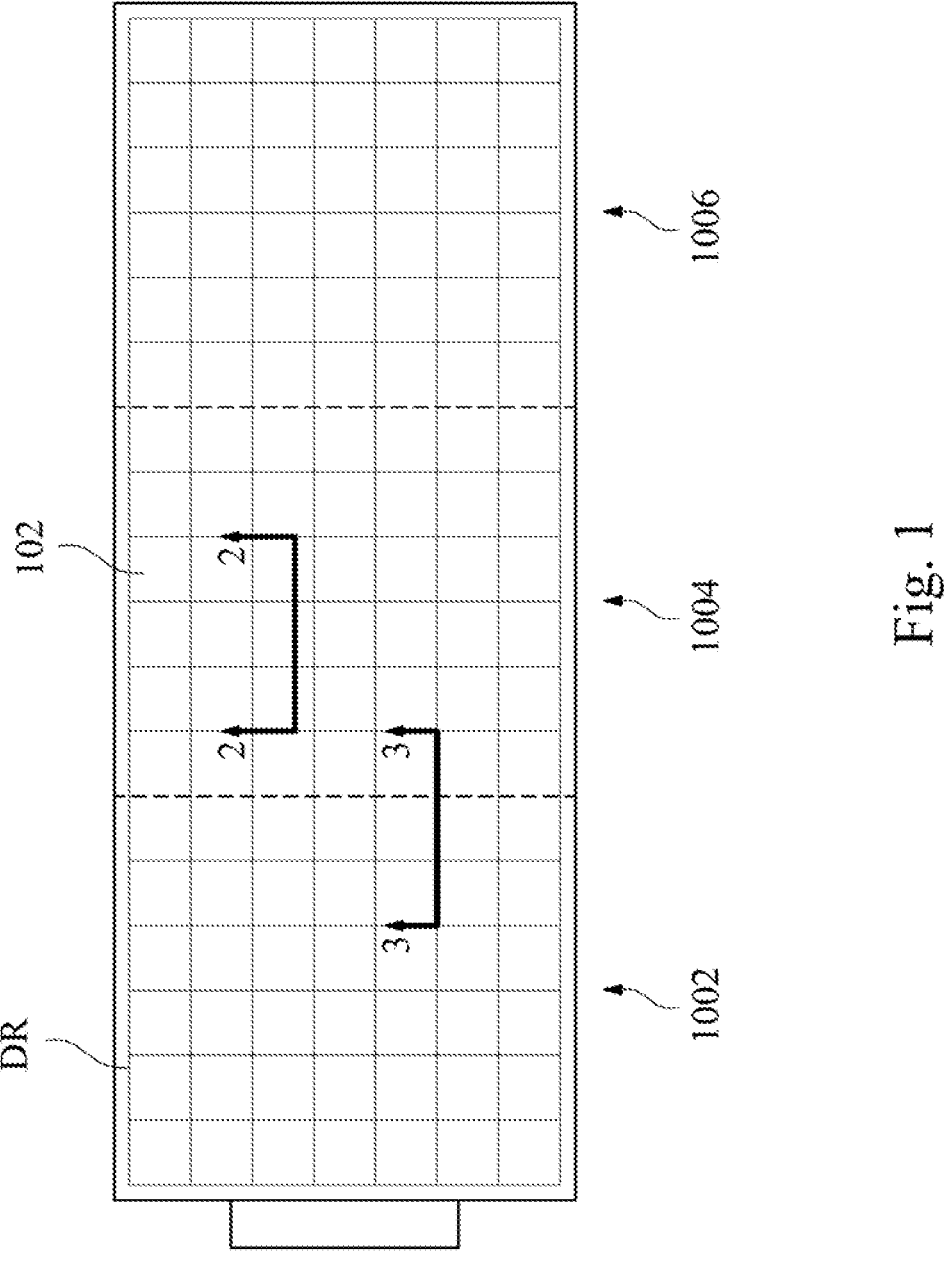
FIG. 1 is a top view of a color electrophoretic display according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
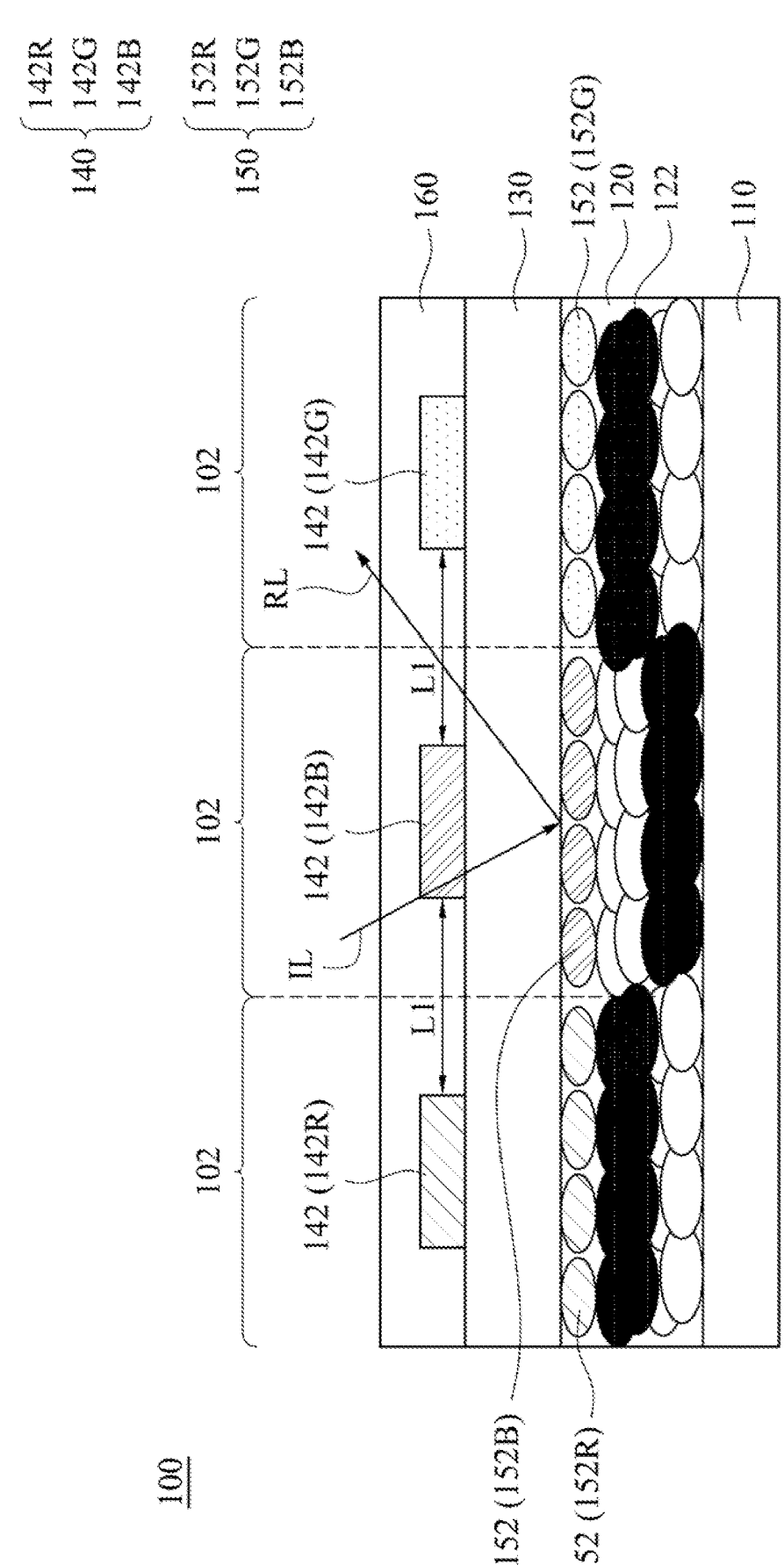
FIG. 2 is a cross-sectional view taken along the line 2-2 in FIG. 1.

FIG. 1 is a top view of a color electrophoretic display 100 according to one embodiment of the present disclosure. FIG. 2 is a cross-sectional view taken along the line 2-2 in FIG. 1. The color electrophoretic display 100 includes a display region DR, a pixel array 110, a display medium layer 120, an optical layer 130, a first color filter array 140, a second color filter array 150, and a protection layer 160. The optical layer 130 may include optical clear adhesive (OCA) or other suitable organic or inorganic materials, the disclosure is not limited thereto.

The display region DR includes multiple sub-pixel regions 102. The pixel array 110 corresponds to the display region DR in position. The display medium layer 120 is located on the pixel array 110. The optical layer 130 is located on the display medium layer 120. The first color filter array 140 is located on the optical layer 130. The second color filter array 150 is located between the display medium layer 120 and the optical layer 130. The second color filter array 150 is directly in contact with the display medium layer 120. The protection layer 160 is located on the first color filter array 140.

The first color filter array 140 and the second color filter array 150 have different pixel fill factors. In the present embodiment, a pixel fill factor of the first color filter array 140 is smaller than a pixel fill factor of the second color filter array 150. Specifically, the pixel fill factor of the first color filter array 140 is in a range from 25% to 35%. The pixel fill factor of the second color filter array 150 is in a range from 70% to 90%.

For example, the first color filter array 140 includes multiple first color resists 142, and each one of the first color resists 142 corresponds to a sub-pixel region 102. A ratio between an area of the first color resists 142 and an area of the sub-pixel region 102 is in a range from 25% to 35%. The second color filter array 150 includes multiple second color resists 152, and each one of the second color resists 152 corresponds to a sub-pixel region 102. A ratio between an area of the second color resists 152 and an area of the sub-pixel region 102 is in a range from 70% to 90%. In other embodiment, each of the first color resists 142 and second color resists 152 may correspond to more than one sub-pixel region 102. That is, the color resist with the same color may be distributed in a range greater than one sub-pixel region 102.

In the present embodiment, the display medium layer 120 includes microcapsules 122. The second color filter array 150 is configured to be printed or ink-jetted on the microcapsules 122. Ink of the second color filter array 150 formed on the microcapsules 122 flows to from the second color resists 152, and the pixel fill factor of the second color resists 152 may reach a range from 70% to 90%.

As shown in FIG. 2, the first color resists 142 include red color resists 142R, blue color resists 142B, and green color resists 142G. In the present embodiment, one of the first color resists 142 and one of the second color resists 152 that correspond to the same sub-pixel region 102 have the same color. In other words, the second color resists 152 also include red color resists 152R, blue color resists 152B, and green color resists 152G, but the present disclosure is not limited thereto.

An incident light IL and a reflective light RL with a viewing angle of 120 degrees are illustrated in FIG. 2. Since the pixel fill factor of the first color filter array 140 is smaller, color mixing problem caused by large viewing angle can be prevented. In other words, the reflective light RL merely passes through the blue color resists 142B, but not the green color resists 142G adjacent to the blue color resists 142B. In general, when the pixel fill factor of the first color resist 142 is smaller than about 40%, the color performance of the color electrophoretic display 100 reduces. Therefore, by disposing the second color filter array 150 on the display medium layer 120, color performance of the color electrophoretic display 100 can be improved or maintained. In other words, by disposing the first color filter array 140 and the second color filter array 150 at the same time, the color mixing problem can be prevented without affecting the color performance.

Reference is made to FIG. 1, the display region DR of the color electrophoretic display 100 is formed by three regions 1002, 1004, 1006. In the process of printing the first color filter array 140, the entire first color filter array 140 is divided as three parts corresponding to the regions 1002, 1004, 1006, respectively. Relative positions of the three parts have drifts so as to eliminate mura formed between different regions. For example, there is a drift of about 20 mm between the three parts to avoid stripes formed due to regular arrangement.

As shown in FIG. 2, the first color resists 142 include red color resists 142R, blue color resists 142B, and green color resists 142G. There aforesaid red color resists 142R, blue color resists 142B, and green color resists 142G are all located in the region 1002. Distance L1 between the red color resists 142R and the blue color resists 142B is equal to the distance L1 between the blue color resists 1426 and the green color resists 142G.

Figure 3:
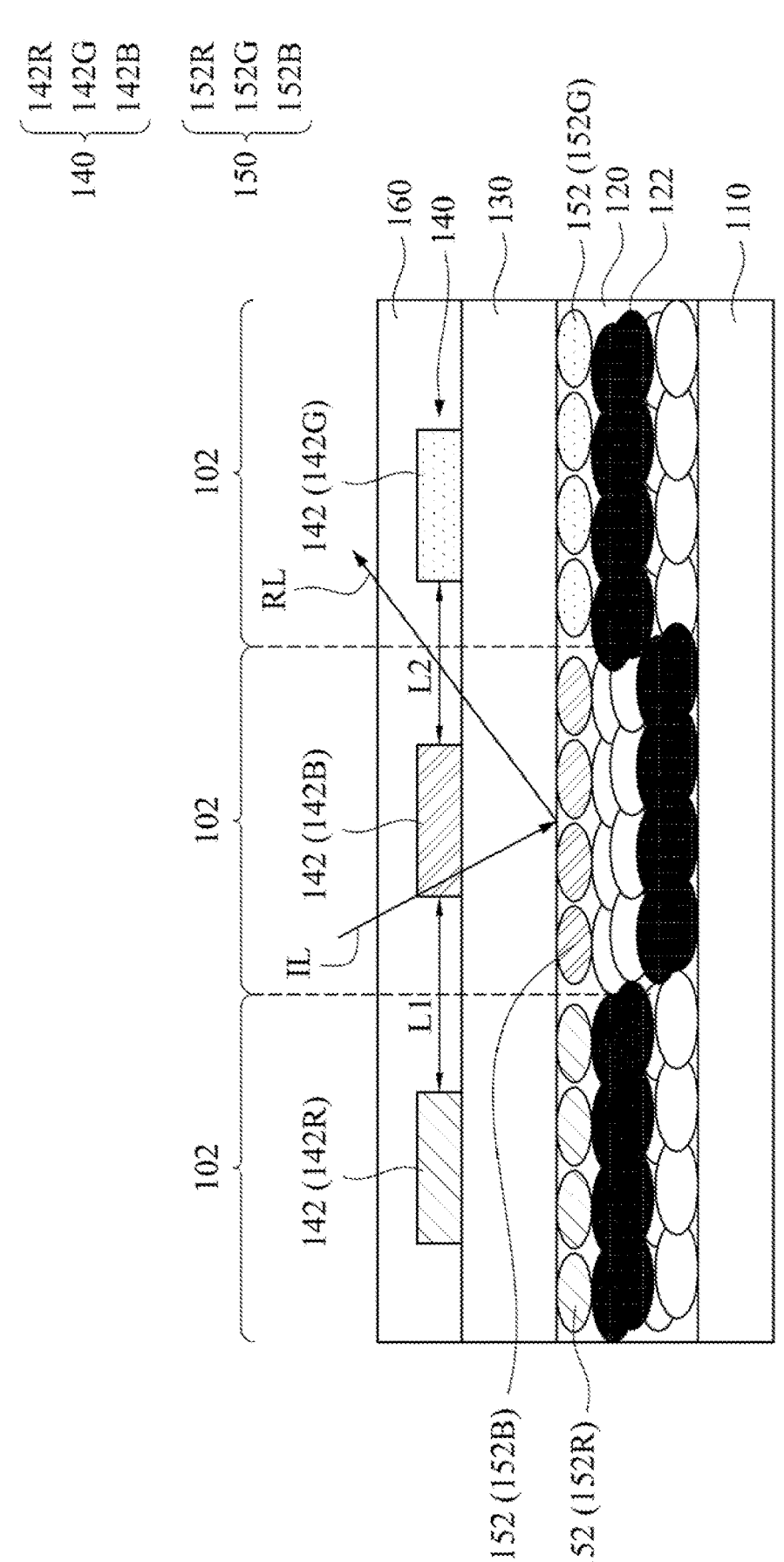
FIG. 3 is a cross-sectional view taken along the line 3-3 in FIG. 1.

FIG. 3 is a cross-sectional view taken along the line 3-3 in FIG. 1. Reference is made to FIG. 1 and FIG. 3. The red color resists 142R and the blue color resists 1426 are located in the region 1002. The green color resists 142G are located in the region 1004. In the present embodiment, a distance L2 between the green color resists 142G and the blue color resists 1426 is smaller than the distance L1 between the red color resists 142R and the blue color resists 1426.

An incident light IL and a reflective light RL with a viewing angle of 120 degrees are illustrated in FIG. 3. When the distance L2 between the green color resists 142G and the blue color resists 1426 becomes smaller the reflective light RL merely passes through the green color resists 142G. Therefore, by reducing the pixel fill factor of the first color filter array 140, color mixing problem at arbitrary positions in the display region DR of the color electrophoretic display 100 due to large viewing angle can be prevented.

Figure 4:
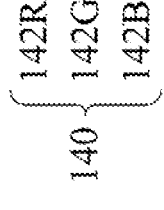
FIG. 4 is a partial top view of the first filter array according to one embodiment of the present disclosure.
Figure 4:
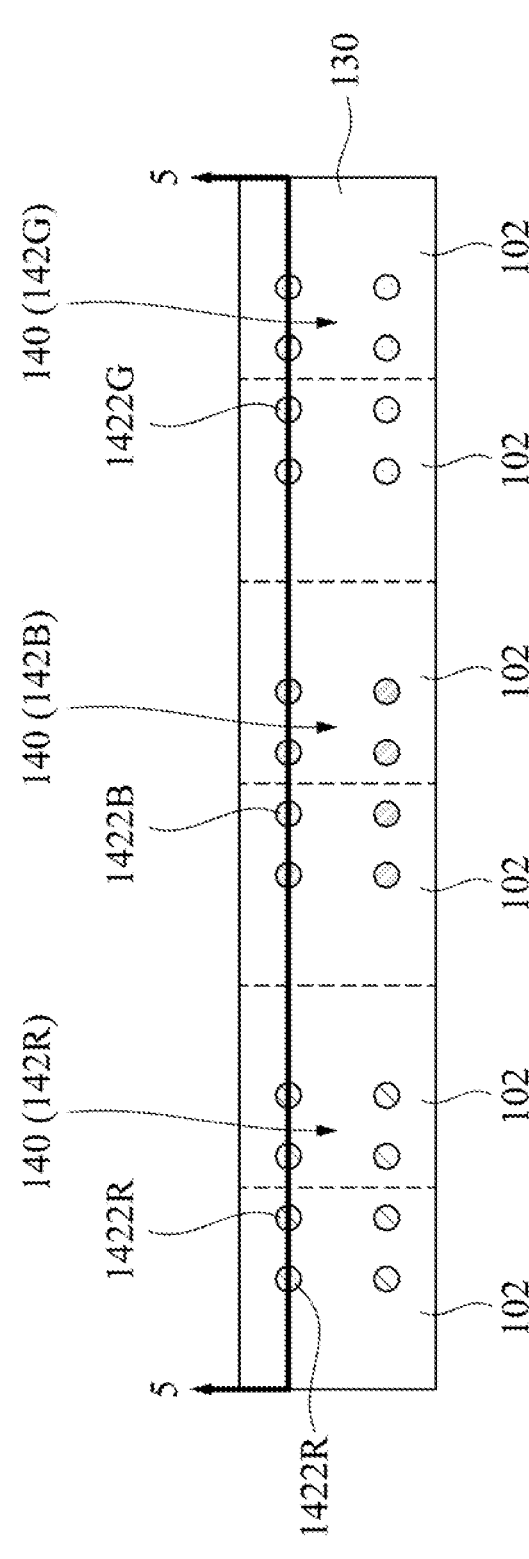
Figure 5:
FIG. 5 is a cross-sectional view taken along the line 5-5 in FIG. 4.

FIG. 4 is a partial top view of the first color filter array 140a according to one embodiment of the present disclosure. FIG. 5 is a cross-sectional view taken along the line 5-5 in FIG. 4. FIG. 4 is the first color filter array 140a of a color electrophoretic display 100a according to another embodiment of the present disclosure, and the protection layer 160 is omitted in FIG. 4. The color electrophoretic display 100a is substantially the same as the color electrophoretic display 100 shown in FIG. 1, and the difference is the configurations of the first color filter array 140a and the second color filter array 150a.

As shown in FIG. 4, the first color filter array 140a has dot pattern. The first color resists 142 of the first color filter array 140a respectively includes multiple red color resists 1422R, multiple blue color resists 1422B, and multiple green color resists 1422G. In the present embodiment, the red color resists 1422R, the blue color resists 1422B, and the green color resists 1422G all has circular profiles and are arranged as a 2×4 array, but the present disclosure is not limited thereto. The red color resists 1422R, the blue color resists 1422B, and the green color resists 1422G respectively correspond to two sub-pixel regions 102, but the present disclosure is not limited thereto.

In the present disclosure, the shapes, numbers, and distribution range of the color resists of the first color filter array 140a can be adjusted arbitrary. By dividing each one of the first color resists 142 of the first color filter array 140a into multiple sections separated with each other, the performance of the color electrophoretic display 100a will not be affected by preventing the texture from appearing on the display.

The difference between the second color filter array 150a of the color electrophoretic display 100a and the second color filter layer 150 shown in FIG. 1 is that the pixel fill factor are not limited. For example, in the present embodiment, the distribution range of the red color resists 152R is smaller than the distribution range of the red color resists 142R. By disposing the second color filter array 150a on the display medium layer 120, color performance of the color electrophoretic display 100a can be improved or maintained. In other words, by disposing the first color filter array 140a and the second color filter array 150a at the same time, the performance of the color electrophoretic display 100a will not be affected by preventing the texture from appearing on the display without affecting the color performance.

Figure 6:
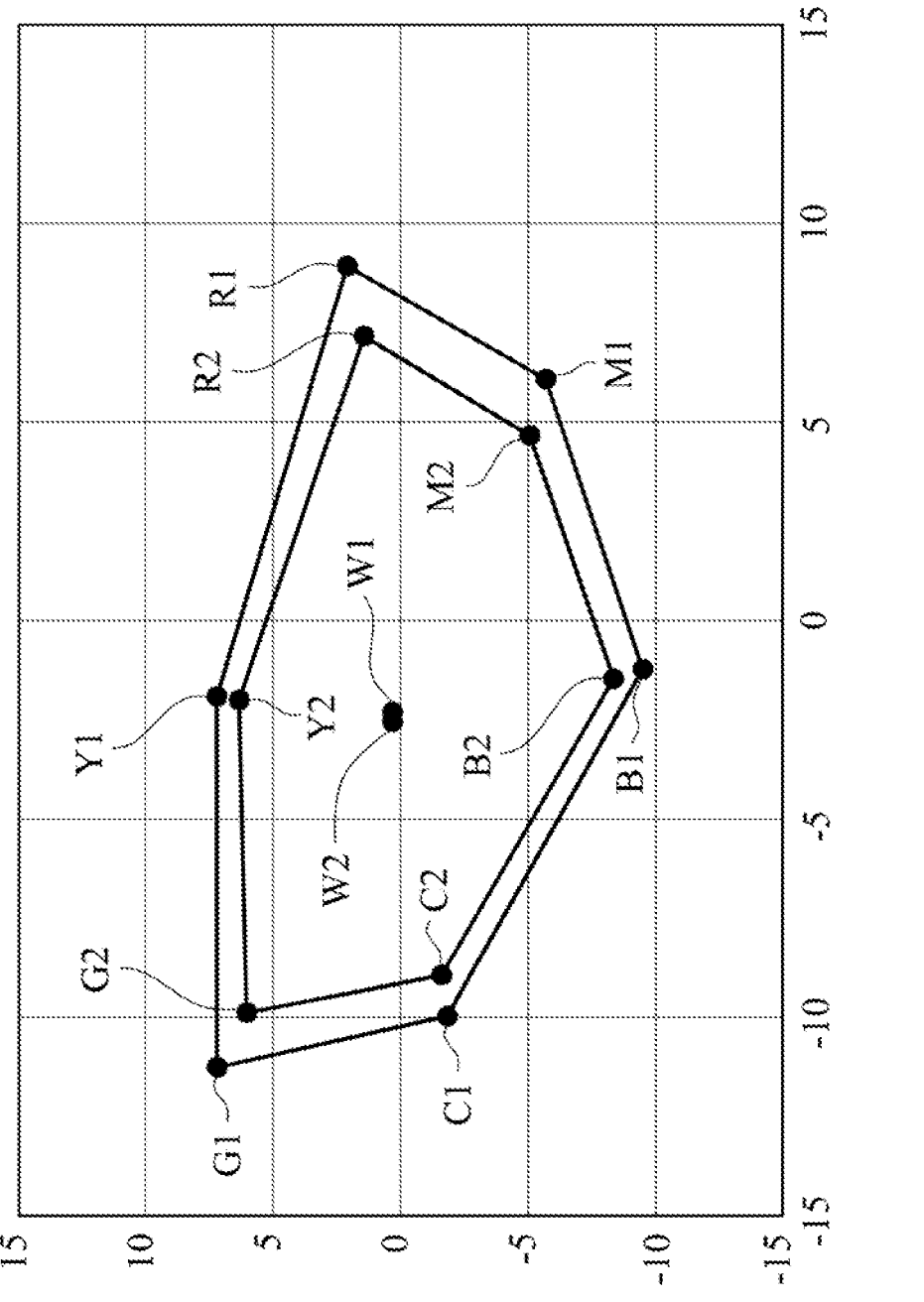
FIG. 6 is a color gamut diagram of a color electrophoretic display according to one embodiment of the present disclosure.

FIG. 6 is a color gamut diagram of a color electrophoretic display according to one embodiment of the present disclosure. The color gamut defined by the coordinates R1(red), G1(green), B1(blue), C1(cyan), M1(magenta), and Y1(yellow) is the color range of the color electrophoretic display 100a shown in FIG. 5. The color gamut defined by the coordinates R2, G2, B2, C2, M2, and Y2 is the color range of a conventional color electrophoretic display. That is, the color electrophoretic display has a single color filter array. It is noted according to FIG. 6, the range defined by the coordinates of the color electrophoretic display 100a is greater than the range of the conventional color electrophoretic display, and therefore the color saturation of the color electrophoretic display 100a is higher.

The values of the white coordinate W1 and the white coordinate W2 reveal the color balance of the electrophoretic displays. The coordinate (0, 0) denotes no color difference between calibrated white state and measured object without considering the brightness (L*). It is noted according to FIG. 6, each colors in the color gamut of the color electrophoretic display 100a are more balanced.

Accordingly, by disposing the first color filter array 140a and the second color filter array 150a, the color saturation and the white balance of the color electrophoretic display 100a can be improved.

Figure 7:
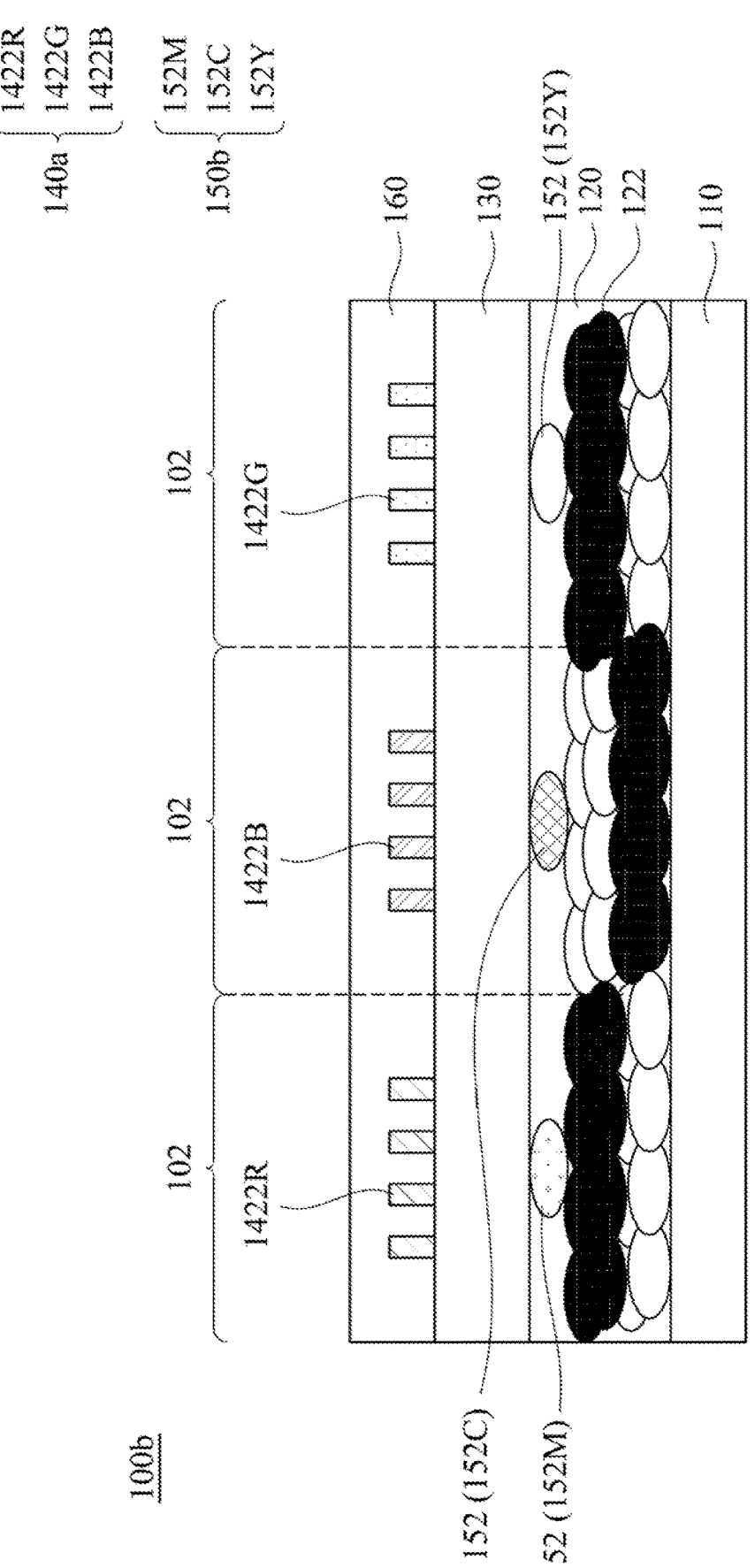
FIG. 7 is a cross-sectional view of another color electrophoretic display according to one embodiment of the present disclosure.

FIG. 7 is a cross-sectional view of another color electrophoretic display 100b according to one embodiment of the present disclosure. The color electrophoretic display 100b is substantially the same as the color electrophoretic display 100a shown in FIG. 5, and the difference is that the second color resists 152 of the second color filter array 150b has a mixing color. For example, the second color resist 152 corresponding to the red color resist 1422R is magenta color resist 152M, and the magenta color is composed of red color and blue color. The second color resist 152 corresponding to the blue color resist 1422B is cyan color resist 152C, and the cyan color is composed of blue color and green color. The second color resist 152 corresponding to the green color resist 1422G is yellow color resist 152Y, and the yellow color is composed of red color and green color.

Figure 8:
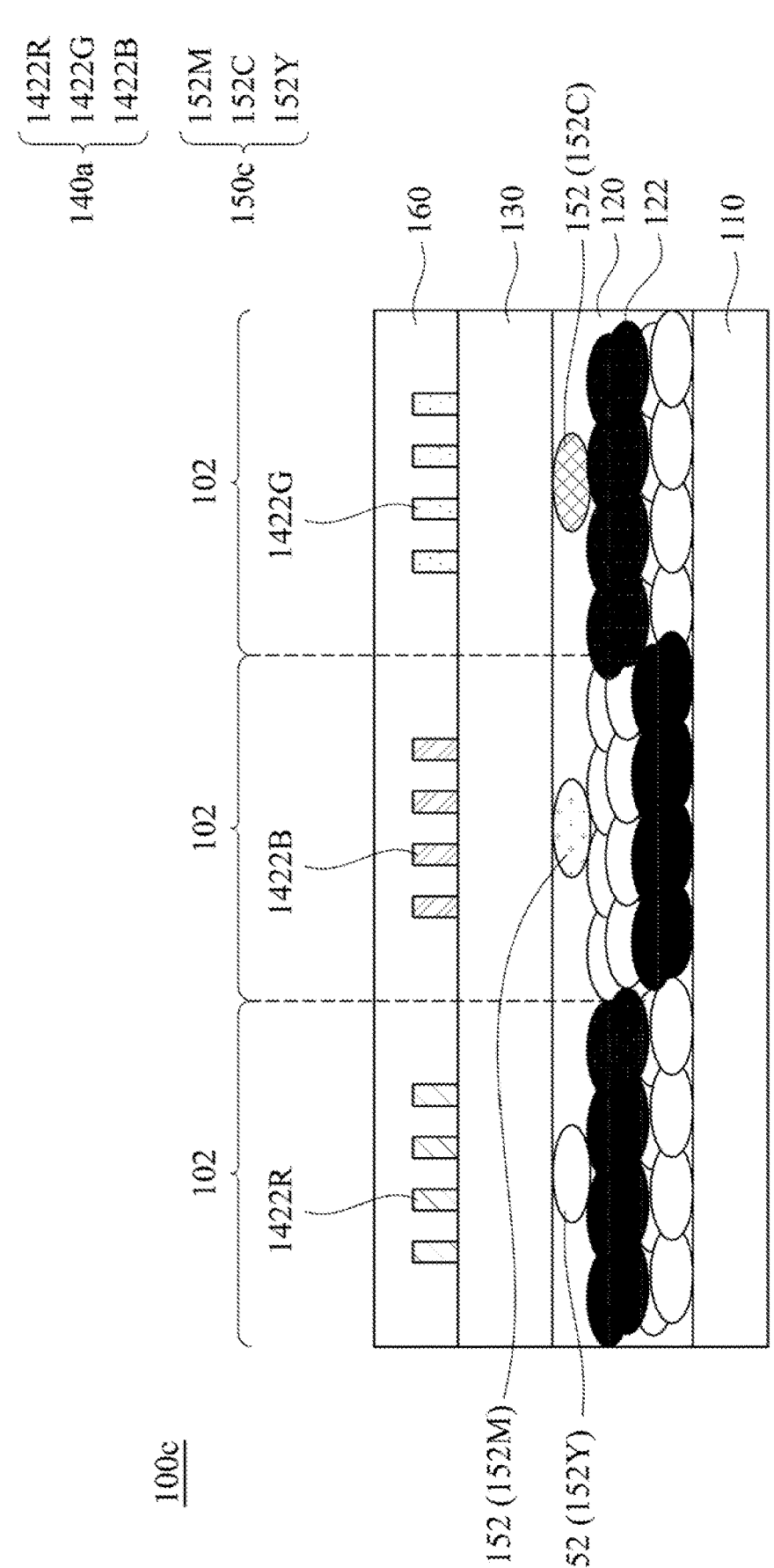
FIG. 8 is a cross-sectional view of another color electrophoretic display according to one embodiment of the present disclosure.

FIG. 8 is a cross-sectional view of another color electrophoretic display 100c according to one embodiment of the present disclosure. The color electrophoretic display 100c is substantially the same as the color electrophoretic display 100b shown in FIG. 7, and the difference is the color of the second color resists 152 of the second color filter array 150c. In the present embodiment, the second color resist 152 corresponding to the red color resist 1422R is yellow color resist 152Y, and the yellow color is composed of red color and green color. The second color resist 152 corresponding to the blue color resist 1422B is magenta color resist 152M, and the magenta color is composed of red color and blue color. The second color resist 152 corresponding to the green color resist 1422G is cyan color resist 152C, and the cyan color is composed of blue color and green color.

In summary, by disposing the second color filter array on the display medium layer, color performance of the color electrophoretic display can be improved or maintained. In some embodiments, the first color filter layer disposed on the optical layer has a smaller pixel fill factor, color mixing problem caused by large viewing angle can be prevented. In some embodiments, by dividing each one of the first color resists of the first color filter array disposed on the optical layer into multiple sections separated with each other, the performance of the color electrophoretic display will not be affected by preventing the texture from appearing on the display. In other words, by disposing the first color filter array and the second color filter array at the same time, the color mixing problem can be prevented without affecting the color performance or the performance of the color electrophoretic display will not be affected by preventing the texture from appearing on the display.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color electrophoretic display, comprising:
a display region comprising a plurality sub-pixel regions;
a pixel array corresponding to the display region in position;
a display medium layer located on the pixel array;
an optical layer located on the display medium layer;

a first color filter array located on the optical layer, wherein a pixel fill factor of the first color filter array is in a range from 25% to 35%; and a second color filter array located between the display medium layer and the optical layer.

2. The color electrophoretic display of claim 1, wherein the first color filter array and the second color filter array have different pixel fill factors.

3. The color electrophoretic display of claim 1, wherein a pixel fill factor of the first color filter array is smaller than a pixel fill factor of the second color filter array.

4. The color electrophoretic display of claim 3, wherein the pixel fill factor of the second color filter array is in a range from 70% to 90%.

5. The color electrophoretic display of claim 1, wherein the first color filter array comprises a plurality of first color resists, and each one of the first color resists comprises a plurality of sections separated from each other.

6. The color electrophoretic display of claim 1, wherein the first color filter array comprises a first color resist, the second color filter array comprises a second color resist, the first color resist corresponds to the second color resists in position, and the first color resist and the second color resist have the same color.

7. The color electrophoretic display of claim 1, wherein the first color filter array comprises a first color resist, the second color filter array comprises a second color resist, the first color resist corresponds to the second color resists in position, and the first color resist and the second color resist have different colors.

8. The color electrophoretic display of claim 7, wherein the first color resist has a first color, the second color resist has a mixed color, and the mixed color comprises the first color and a second color different from the first color.

9. A color electrophoretic display, comprising:

a display region comprising a plurality sub-pixel regions;

a pixel array corresponding to the display region in position;

a display medium layer comprising a plurality of micro-capsules, wherein the display medium layer is located on the pixel array;

an optical layer located on the display medium layer;

a first color filter array located on the optical layer, wherein a pixel fill factor of the first color filter array is in a range from 25% to 35%; and a second color filter array formed on the microcapsules.

10. The color electrophoretic display of claim 9, wherein the second color filter array is configured to be printed or ink-jetted on the microcapsules.

11. The color electrophoretic display of claim 9, wherein a pixel fill factor of the first color filter array is smaller than a pixel fill factor of the second color filter array.

12. The color electrophoretic display of claim 11, wherein the pixel fill factor of the second color filter array is in a range from 70% to 90%.

13. The color electrophoretic display of claim 9, wherein the first color filter array comprises a plurality of first color resists, and each one of the first color resists comprises a plurality of sections separated from each other.

14. The color electrophoretic display of claim 9, wherein the first color filter array comprises a first color resist, the second color filter array comprises a second color resist, the first color resist corresponds to the second color resists in position, and the first color resist and the second color resist have the same color.

15. The color electrophoretic display of claim 9, wherein the first color filter array comprises a first color resist, the second color filter array comprises a second color resist, the first color resist corresponds to the second color resists in position, and the first color resist and the second color resist have different colors.

16. The color electrophoretic display of claim 15, wherein the first color resist has a first color, the second color resist has a mixed color, and the mixed color comprises the first color and a second color different from the first color.

* * * * *